Figure 7:
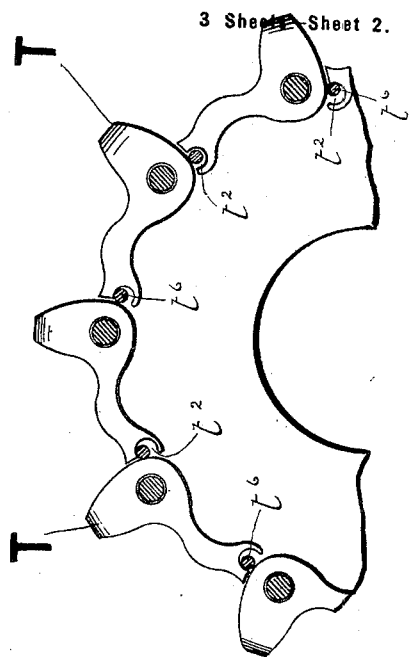

No. 622,738. Patented Apr. 11, 1899.
T. R. VOCE & B. DRYSDALE.
SPROCKET DRIVING WHEEL.
(Application filed Feb. 12, 1898.)
(No Model.) 3 Sheets—Sheet 1.
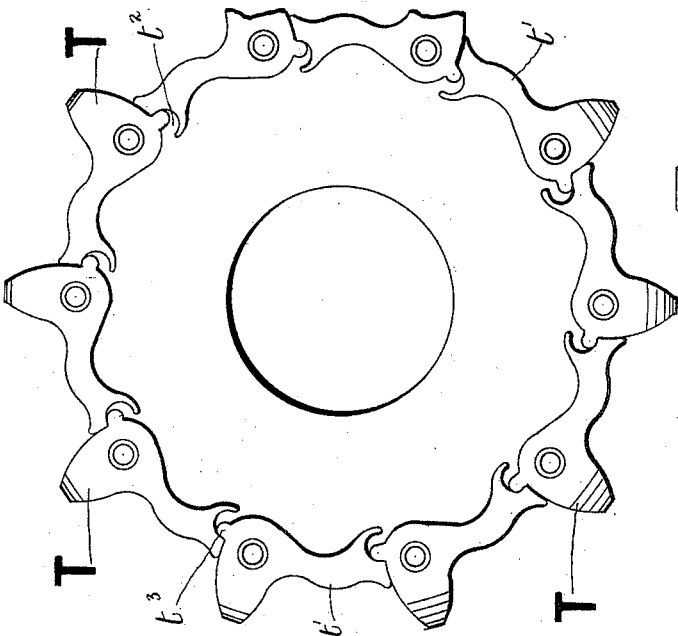
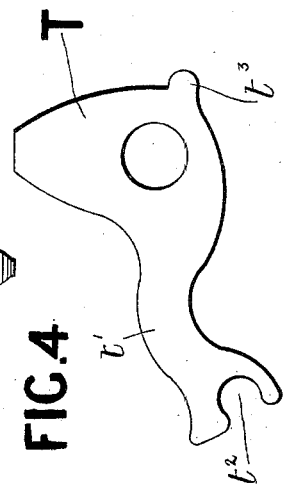
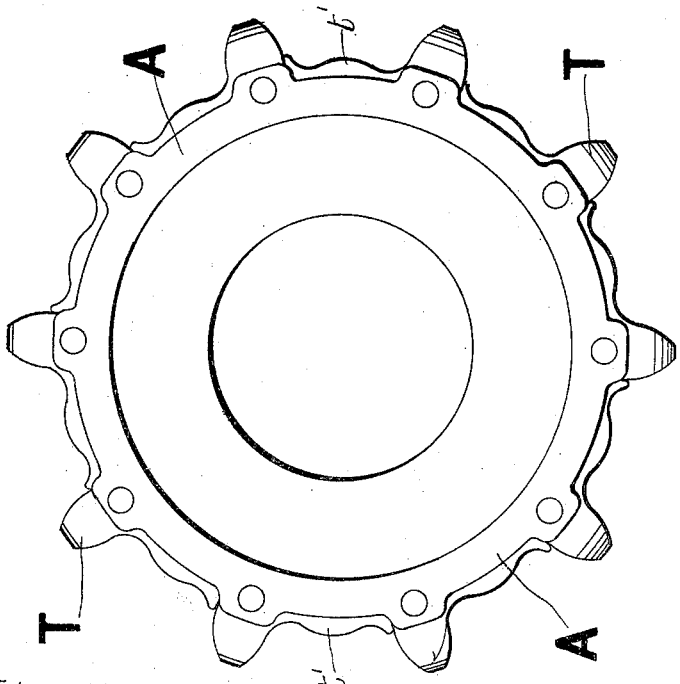
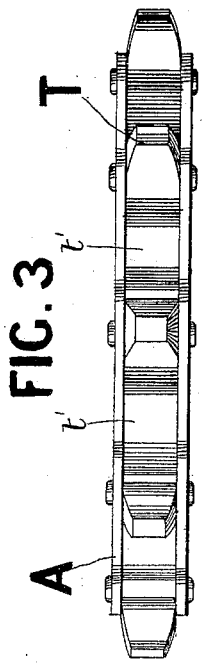

No. 622,738. Patented Apr. 11, 1899.
T. R. VOCE & B. DRYSDALE.
SPROCKET DRIVING WHEEL.
(Application filed Feb. 12, 1898.)
(No Model.) 3 Sheets—Sheet 2.

Witnesses,
George M. Richards
Wm. R. Davis

Inventors,
Thomas R. Voce
Bruce Drysdale
by Wm H Babcock
Attorney

THE NORRIS PETERS CO., PHOTO-LITHO., WASHINGTON, D. C.

No. 622,738.  
T. R. VOCE & B. DRYSDALE.  
SPROCKET DRIVING WHEEL.  
(Application filed Feb. 12, 1898.)  
Patented Apr. 11, 1899.

(No Model.)  
3 Sheets—Sheet 3.

UNITED STATES PATENT OFFICE.

THOMAS REGINALD VOCE AND BRUCE DRYSDALE, OF BIRMINGHAM, ENGLAND.

SPROCKET DRIVING-WHEEL.

SPECIFICATION forming part of Letters Patent No. 622,738, dated April 11, 1899.

Application filed February 12, 1898. Serial No. 670,050. (No model.)

*To all whom it may concern:*

Be it known that we, THOMAS REGINALD VOCE and BRUCE DRYSDALE, manufacturers, subjects of the Queen of Great Britain, residing at 176 Bolton road, Small Heath, Birmingham, in the county of Warwick, England, have invented certain new and useful Improvements in Sprocket Driving-Wheels for Cycles and other Purposes, (for which we have made application for Letters Patent in England, No. 16,698, dated July 14, 1897;) and we do hereby declare the following to be a full, clear, and exact description of the invention, such as will enable others skilled in the art to which it appertains to make and use the same.

Our invention has for its object improvements in sprocket driving-wheels for cycles and other purposes by which we are enabled to greatly reduce the friction which exists in sprocket-wheels as at present constructed and also to adjust the teeth to suit the pitch of the driving-chain.

We have termed our invention the "expanding chain-wheel."

In carrying our invention into practive we form our sprocket or chain wheels from two rings, between which the teeth are secured. These teeth are pivoted to the rings and are free to move and adjust themselves to the variations in the pitch of the chain, each tooth having a projection at one side at its base at right angles to itself extending around a portion of the periphery of the wheel and forming a bed for the chain to rest upon, which automatically tends to form a larger diameter than the actual pitch of the chain requires, thus allowing for a considerable stretch of the chain. The ends of the projections at the base of the teeth are recessed, so as to fit onto smaller projections formed at the base on the opposite side of the tooth, thus interlocking each other, so that the pressure and pull of the chain on the teeth in work cause the tooth about to enter the link of the chain to tilt backward and the tooth about to leave to tilt forward, allowing the chain to engage and disengage with the least possible friction. The entering tooth is brought into contact with the link directly the pressure of the chain bears upon the extended portion at the base of the tooth, and the leaving tooth loses contact with the link as the pressure of the chain ceases upon this extended portion.

In order that our invention may be more clearly understood and easily carried into practical effect, we append hereunto a sheet of drawings, upon which we have illustrated sufficient examples to show the nature of our improved sprocket-wheels.

Figure 6:
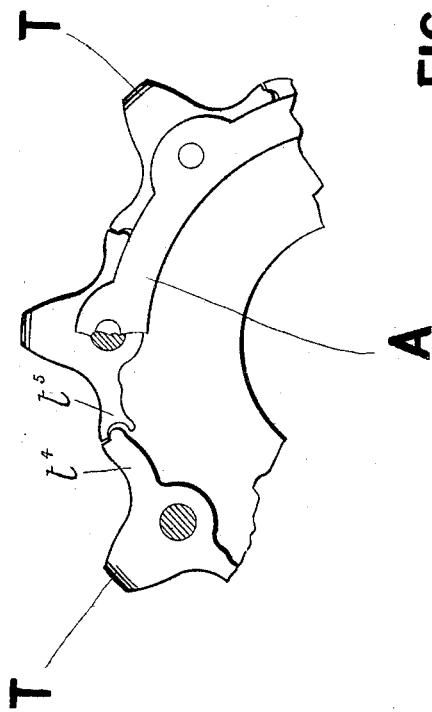
Figure 5:
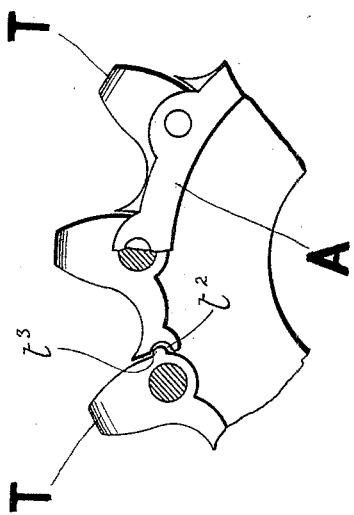
Figure 8:
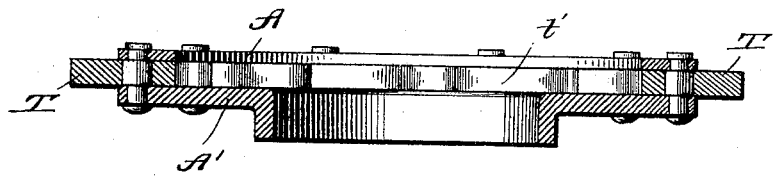
Figure 9:
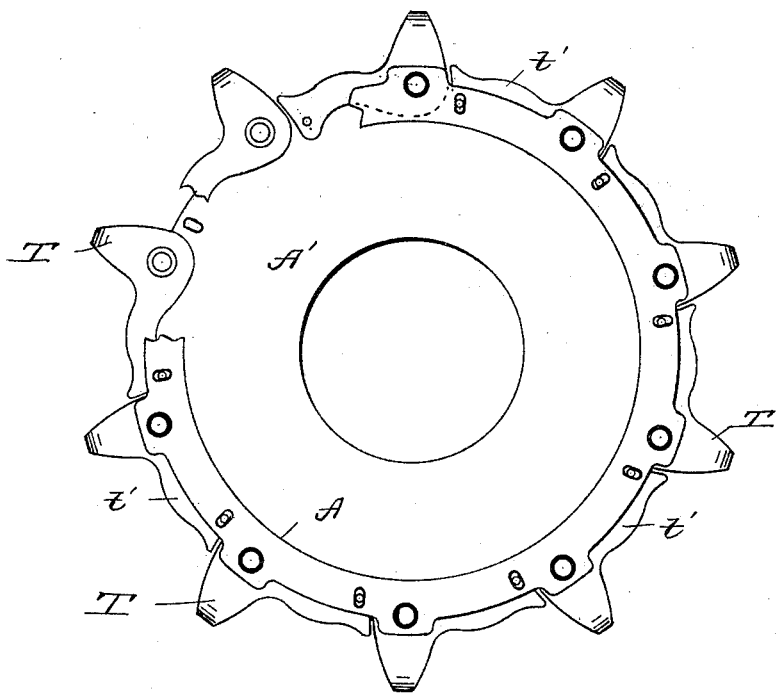

Figure 1 is a front elevation of a sprocket-wheel made according to our invention. Fig. 2 is a similar view to Fig. 1, with the ring A removed. Fig. 3 is a plan view of Fig. 1. Fig. 4 is an enlarged view of one of the sprocket-wheel teeth. Fig. 5 represents a portion of a sprocket-wheel adapted for a single-roller driving-chain. Figs. 6, 7, and 9 represent modifications of our sprocket-wheels. Fig. 8 represents a cross-section of Fig. 1 on the line $x\ x$.

In carrying our invention into practice we form our sprocket-wheel of two main parts—the wheel proper, $A'$, and a ring A, which has its periphery equal to that of the wheel $A'$ and parallel to it. The said wheel and ring, virtually forming a pair of flanges or rings, are riveted together, leaving a space between entirely open above and beneath. In this space, on the same pivots which serve to rivet the rings A and $A'$ together, we pivot the teeth T, which teeth are free to rock or move and adjust themselves to the variations in the pitch of the chain. These teeth, which we call "lever-teeth," are formed with the tailpiece or extended portion $t'$ at their base, which forms that portion of the periphery of the wheel upon which the driving-links of the driving-chain rest, and at the ends of this extended portion we form the slot $t^2$. On the opposite side of the base of these teeth we form the projections $t^3$, which projections take into the slots $t^2$ in the end of the tailpiece of the next tooth. By these means it will be seen that all the teeth interlock each other, so that the pressure or pull of the driving-chain on those teeth in engagement with the chain causes the tooth about to enter the link of the chain to tilt backward and the tooth about to leave the link to tilt forward with the least possible friction. The entering tooth is brought into contact with the link directly the pressure of the chain bears upon the tailpiece $t'$, and the leaving tooth loses contact with the link as the pressure of the chain ceases upon the tailpiece.

The tailpiece of each tooth is very much longer than the distance from the pivot to the end of the forward projection.

As the teeth are all of the same size and form, it follows that there is a great difference in leverage in favor of the long tail as compared with the part of the next tooth which engages it. Consequently even a much stronger pull on any one tooth will not suffice to depress the long tail $t'$ of the next tooth, but each succeeding tooth will be certainly and rapidly tilted by the forward pull of the chain, which necessarily lifts the tail thereof, tilting upward the next projection $t^3$ strongly and certainly. Each recess $t^2$ is made broad enough to allow sufficient play of the projection $t^3$, which engages with it.

At Fig. 5 we have shown our sprocket-wheel with the tailpiece of the teeth shortened, so as to bring the teeth closer together to form a sprocket-wheel suitable for single-roller driving-chains. It will be quite evident that instead of forming the slot $t^2$ in the end of the tailpiece the projection $t^3$ may be formed at this end and the slot $t^2$ at the opposite side near the base of the tooth.

At Figs. 6 and 7 we have shown two modifications of our lever-tooth sprocket-wheels. In the method as shown at Fig. 6 we form the tailpieces $t^4$ and $t^5$ at either side of each tooth, one of the tailpieces being slotted at the end and the other being formed with a projection which takes into the slot in the tailpiece of the next tooth. By this arrangement the tooth will tilt in either direction. In the modification as shown at Fig. 7 instead of forming the projection $t^3$ at the base of each tooth we fix the pegs $t^6$ into one or both of the inner faces of the rings to which the teeth are pivoted, onto which the slotted end of the tailpiece takes the expanding action, being exactly similar, as previously described; or a projection may be formed, as shown in Fig. 9, on the end of the tailpiece of each tooth and a slotted piece fixed to the inner face of one or both of the rings A or A'. These modifications may be applied to the sprocket-wheel, as shown at Fig. 6.

We claim—

1. A sprocket-wheel provided at its periphery with an annular series of pivoted teeth, each of which is provided with a long rearward tailpiece $t'$ having a terminal recess $t^2$ and with a forward projection $t^3$, the pivotal point of each tooth being under that part of it which is adapted to engage the chain, the recess $t^2$ of each tooth receiving the projection $t^3$ of the next one, and the recess $t^2$ of each tooth being much farther from the pivotal point thereof than is the projection $t^3$ of the same tooth, substantially as set forth.

2. A sprocket-wheel provided at its periphery with an annular series of pivoted teeth, each of which is provided with a long rearward tailpiece $t'$ having a terminal recess $t^2$ and with a forward projection $t^3$ arranged to interlock with the recessed end of the next tooth, the recess $t^2$ of each tooth being much farther from the pivotal point than is the projection $t^3$ and also much broader than the projection interlocking with the said recess, substantially as and for the purpose set forth.

3. A sprocket-wheel provided at its periphery with a series of pivoted teeth, each tooth having a long rearward tailpiece and a shorter forward part, each proximate tailpiece and forward part being adapted to engage each other and thereby connect all the teeth in annular series, and the distance of the engaging part of each tailpiece from the pivot of the tooth being much greater than the distance of the end of the forward part of said tooth from the pivot thereof, substantially as set forth.

In testimony whereof we affix our signatures in presence of two witnesses.

THOMAS REGINALD VOCE.
    BRUCE DRYSDALE.

Witnesses:
    GEORGE LESTER,
    E. S. FRIEND.